United States Patent [19]
Kaiser et al.

[11] 4,064,530
[45] Dec. 20, 1977

[54] NOISE REDUCTION SYSTEM FOR COLOR TELEVISION

[75] Inventors: Arthur Kaiser, Trumbull; James Kenneth Moore, Springdale, both of Conn.; William E. Glenn, Jr., Fort Lauderdale, Fla.

[73] Assignee: CBS Inc., New York, N.Y.

[21] Appl. No.: 740,576

[22] Filed: Nov. 10, 1976

[51] Int. Cl.² .................. H04N 9/535; H04N 5/21
[52] U.S. Cl. ................................. 358/36; 358/167
[58] Field of Search .................. 358/13, 21, 36, 85, 358/141, 142, 160, 167; 325/308, 65, 323; 179/2 N; 343/5 VQ

[56] References Cited

U.S. PATENT DOCUMENTS 3,875,584   4/1975   Fletcher et al. .................. 358/167

Primary Examiner—John C. Martin
Assistant Examiner—Aristotelis M. Psitos
Attorney, Agent, or Firm—Spencer E. Olson

[57] ABSTRACT

A system for reducing noise in a color video signal which utilizes frame store integration and includes a delay or storage device for storing a single television frame, a summing device for adding a fractional amplitude portion of the signal stored in the storage device to a fractional amplitude portion of the present video signal, and a chrominance corrector circuit for altering the chrominance component of the stored signal so as to be in the proper phase relationship to be summed with the chrominance component of the present video signal. The system is operative automatically to change the fractional amplitude portion of the stored signal fed back to the summing device as a function of the difference between stored and present signals thereby to change the integration time constant of the system to accommodate for motion between the present signal and the stored frames. The system functions as a comb filter whose tines are very narrow when there is little or no motion between the present and stored frames and which are automatically widened to allow motion to be portrayed when there is relative motion between past and present signals.

11 Claims, 5 Drawing Figures

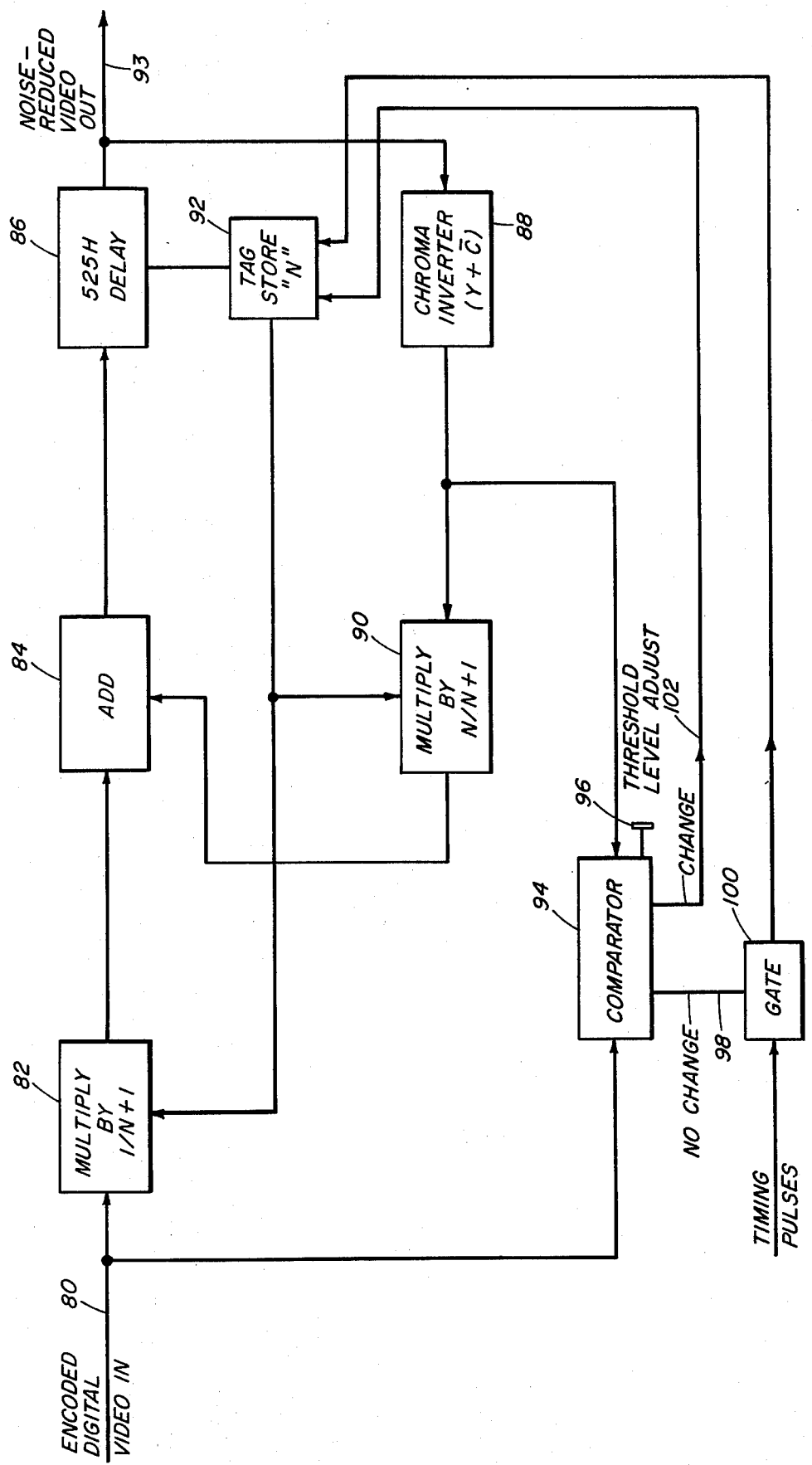

NOISE REDUCTION SYSTEM FOR COLOR TELEVISION

BACKGROUND OF THE INVENTION

This invention relates to color television systems, and is more particularly concerned with signal-processing systems for improving the signal-to-noise ratio of color video signals.

There is a continuing desire and frequent need in the art of generation and transmission of television to improve the signal-to-noise ratio of the video signal. The problem of excessive noise in the video signal is particularly acute in the currently evolving electronic news gathering (ENG) application of television in which a portable camera is taken into the field, often to locations in which the available light is marginal at best, making it necessary to increase the video gain of the camera to obtain an acceptable picture; this increase in video gain results in an attendant increase in the associated noise displayed in the picture. The problem is further compounded in ENG by the fact that the signal from the camera is usually recorded on a small portable recorder for subsequent playback and transmission by a microwave link to a base station. At the base station, prior to actual broadcast of the signal, the video signal may be subjected to two or three levels of editing, all of these steps introducing additional noise of different forms, so that the ultimate signal available for airing is frequently seriously degraded. Even if the signal delivered by the camera were free of noise, the necessary further processing degrades the signal to a degree that the quality of the portrayal on the home receiver is less than would be desired. A general object of the present invention is to provide a system for reducing noise in a color video signal thereby to improve the signal-to-noise ratio and consequently the quality of the displayed television picture.

The present invention takes advantage of the fact that television signals are periodic, whereas noise is aperiodic or random. In the NTSC system of television, the lowest repetition frequency is the frame rate, namely, 30 frames per second, with each frame consisting of 525 lines. For the eye to preserve continuity, any two successive frames must be very much alike, and in fact, if no motion is present in the picture, every frame will be a reproduction of the one that immediately precedes it. If a signal waveform is repetitive, signal-to-noise ratio can often be improved by making use of the redundant information inherent in repetition. Systems employing this technique are generally classified as signal averagers, the principle of which is described in an article by Charles R. Trimble entitled, "What Is Signal Averaging?" appearing in the April 1968 issue of the HEWLETT-PACKARD JOURNAL. Although not concerned with noise reduction in color video signals, the paper describes in a general way the principle of noise reduction by signal averaging.

The principle of signal averaging to achieve noise reduction has been employed in radar applications, two examples of which are described in a paper entitled, "Signal-To-Noise Improvement Through Integration In A Storage Tube", Harrington and Rogers, *Proceedings of the IRE*, October 1950, and in a paper entitled, "Analysis Of A Comb Filter Using Synchronously Commutated Capacitors", LePage, Cahn and Brown, *AIEE Transactions*, March 1953. Both papers deal with a class of noise reduction utilizing integration or averaging, but do not address the effect of motion between successive periodic signals on the effectiveness of the noise reduction. Both papers characterize the signal averaging system as a comb filter, many forms of which are now used in television and elsewhere because of their effectiveness in eliminating unwanted noise energy without affecting the wanted periodic signal. The filters described in these two papers are of the recursive type wherein the present signal is added to the sum of a multiplicity of earlier versions of substantially the same signal so as to achieve in effect, an infinite history of the periodic signal. Neither of these papers, however, suggest how the systems might be utilized to reduce noise in a color video signal, and, as has been noted, do not suggest a solution to the problem of motion.

Application of the principle of recursive filtering for noise reduction in television signals is described in a paper by Murray J. Stateman and Murray B. Ritterman entitled, "Theoretical Improvement In Signal To Noise Ratio of Television Signals By Equivalent Comb Filter Technique" published in 1954 in *IRE National Convention Record*, Volume 2, Part 4. This paper describes how redundancy and knowledge of the past signals can be used to reduce the noise reaching the television screen. On the assumptions that the signals are approximately periodic from frame to frame, and the deviations of the transmitted signal from periodicity are small, and that a serious source of deterioration in picture quality is due to random impulse type noise, by limiting the difference between elemental signals in successive frames to a value consistent with the portrayal of a moderate degree of motion, the noise pulses are attenuated before reaching the television screen. A device suggested by the authors for restraining the incoming television signal includes an amplitude gate in which the present video signal is compared with a signal delayed by one frame period. The amplitude gate passes the present video signal only if it lies within a preset range, that is, if it is within a predetermined range of the previously accepted signal amplitude. When the present video signal lies outside that range, then it is modified in the amplitude gate so that it is no further from the previous signal than the predetermined amount. The modified output signal is then fed to the deflection and video circuits, and also to the one frame delay where it is stored for comparison with the next incoming corresponding signal. The stored signal is not combined with the present incoming signal, but, rather, is compared with the present signal and the present signal modified in some proportion of the difference between the stored and present signals. The amount of stored signal compared with the present signal is always constant, which has the effect of placing a restraint on the integration achieved by the system, which, in turn, has the effect of restraining the motion complexity which may be portrayed. In other words, in the Ritterman and Stateman system a small amount of motion is allowed to take place, the authors recognizing that if more than that amount of motion occurs the portrayal will be severely degraded, as by smearing of the picture. Although the Stateman and Ritterman system will achieve an improvement in signal-to-noise ratio in a black and white television signal, it does not adequately solve the problem of motion and is incapable of reducing noise in a color video signal.

U.S. Pat. No. 3,875,584 discloses a noise reduction system for a color video signal which utilizes filtering of the nonrecursive type in that the present frame of video is summed with one or more preceding frames delayed by one or more frame periods, as by storage on separate channels of a disc recorder. This system deals (somewhat inadequately) with the problem of motion between succeeding frames by simply reducing the number of past frames that are integrated, and does not attempt to reduce noise that may be present in the chrominance component of the video signal. The incoming signal is applied to a comb filter which divides the signal into its luminance and chrominance components, and the luminance component of up to four successive earlier frames are stored in a multichannel disc recorder to enable summing of the luminance component of the present frame with the luminance component of at least one and up to four preceding frames in order to obtain noise reduction in the luminance component. The noise-reduced luminance component is then recombined with the separated and appropriately delayed chrominance component of the present signal to obtain a reconstructed video signal for broadcast or display. While this system has the capability of reducing noise, it bypasses the problem of dealing with noise occurring in the chrominance component, the effect of which is highly visible in the television display and regarded by those versed in the broadcasting art as at least as objectionable as that produced by noise occurring in the luminance component. Thus, the system described in U.S. Pat. No. 3,875,584 is incapable of reducing noise in the chrominance component of the color video signal, it does not satisfactorily solve the motion problem in the respect that its effectiveness in reducing noise when there is significant motion between successive frames, and since it utilizes nonrecursive filtering, the system requires as many storage channels as the manner of signals one desires to sum, an aspect which obviously contributes to the complexity and cost of the system.

Accordingly, it is a primary object of the present invention to provide a system for reducing noise in a color video signal which overcomes the shortcomings of prior systems, and more particularly to provide a system that reduces noise in both the luminance and chrominance components of the signal while more adequately solving the problem of motion than was achievable with prior systems.

SUMMARY OF THE INVENTION

Briefly, the system according to the invention includes a delay or storage device for storing a single television frame, a summing device for adding a portion of the amplitude of the stored signal to a portion of the amplitude of the signal representing a corresponding present frame, and a chrominance corrector circuit for altering the phase of the chrominance component of the stored signal such that it is in the appropriate phase to be summed with the chrominance component of the present video signal. In a system designed for use in the NTSC television, in which the phase of the chrominance component is inverted from frame to frame, the chrominance corrector consists of a chroma inverter which separates the chrominance and luminance components of the stored signal, inverts the chrominance component, and recombines the inverted chrominance component with the luminance component, with the recombined signal applied to the summing device. The portion of the stored signal that is added to the incoming, or present signal, is automatically changed as a function of the difference between the stored past frames and the present frame, thus producing the effect of changing the integration time constant of the system. More specifically, as the difference between the stored past signal and the present signal increases, indicating motion of the present signal with respect to the stored past signals, the portion of the stored signal fed back to the summer is decreased, resulting in a faster integration time constant which, in turn, has the effect of broadening the "tines" of the comb filter thereby to allow motion to be portrayed while at the same time achieving significant noise reduction. Conversely, when there is little or no motion between the present and past signals, the portion of the stored signal fed back to the summer is increased and the integration time constant is slower, which has the effect of narrowing the tines of the comb filter thereby to more effectively reduce the unwanted noise.

BRIEF DESCRIPTION OF THE DRAWINGS

Other objects, features and advantages of the invention will be evident, and its construction and operation better understood, from the following detailed description taken in conjunction with the accompanying drawings, in which:

FIG. 5 is a block diagram of an alternative form of noise reducing system embodying the principles of the invention.

DESCRIPTION OF THE PREFERRED EMBODIMENT

Although the noise reducing system of the invention is useful for improving the signal-to-noise ratio of the color video signal in any of the currently used color television systems, the invention will be described as applied to the NTSC television, along with appropriate indication of the modifications required to accommodate to other systems, such as PAL and SECAM. Further, although the system may be implemented in either the analog or the digital domain, a digital implementation of the system will be described.

Figure 1:
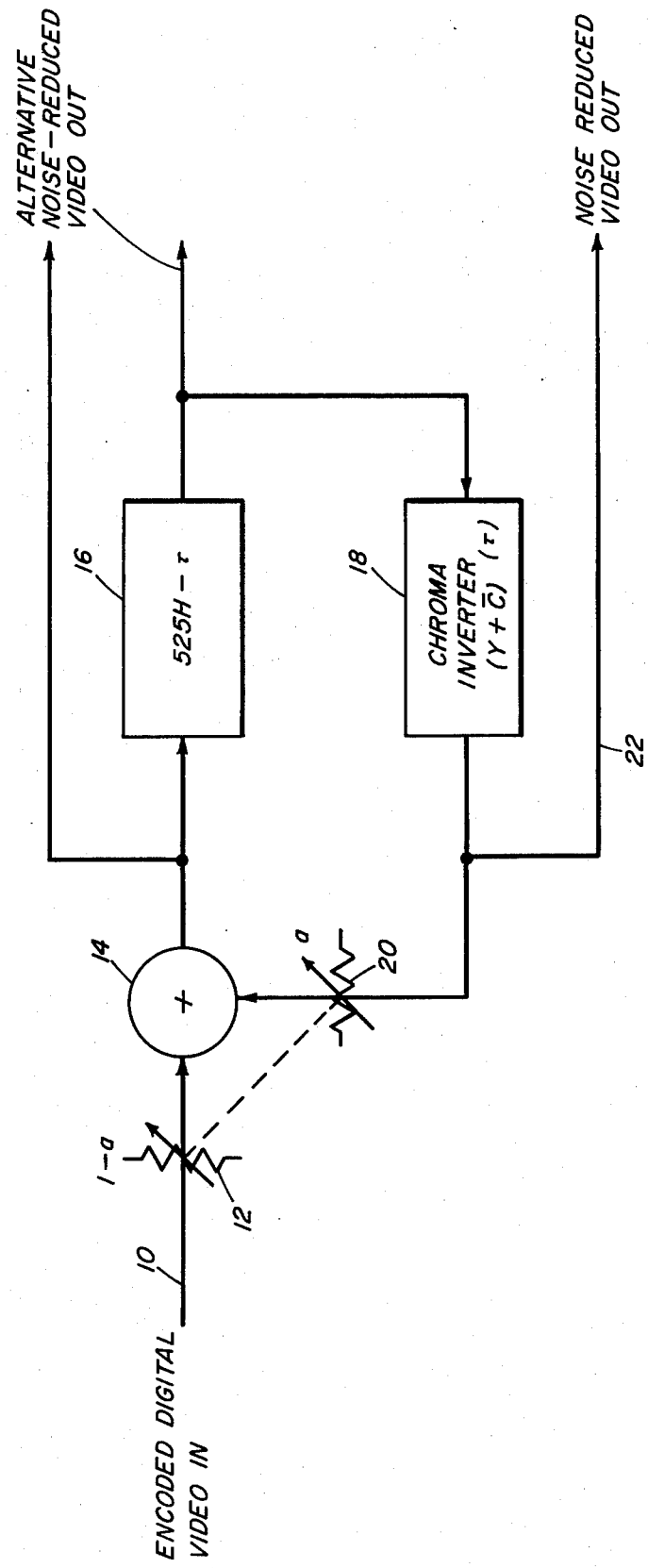
FIG. 1 is a block diagram of a preferred embodiment of a noise-reducing system according to the invention.

Referring now to FIG. 1, the video input signal on input line 10, which may be encoded by the pulse code modulation (PCM) technique described in U.S. Pat. No. 3,946,432 utilizing an 8-bit code, is applied via a variable attenuator 12 to one input terminal of an adding or summing circuit 14. The output signal from the summer 14 is applied to a delay device 16 having a delay of 525H − τ; H represents one television line interval which means that the delay device introduces a one frame delay since there are 525 lines per frame in the NTSC system. In a practical system the delay is actually slightly less than one frame by the period τ for reasons that will become apparent as the description proceeds. The output of delay device 16 is applied through a chroma inverter 18 and a variable attenuator 20 to a second input terminal of the summer 14. Attenuators 12 and 20, shown very schematically in FIG. 1, are ganged and respectively introduce a transmission constant of $(1-a)$ and "$a$". That is, a fractional portion $(1-a)$ of the amplitude of the incoming or "present" video signal is applied to one input to the summer 14 and a fractional portion "$a$" of the amplitude of the stored video signal from delay device 16 is applied to the other summer input. It will be evident that if the value of "$a$" is increased, for example, the proportion of the stored signal applied to the summer increases, and the proportion of the present video signal applied to the summer decreases. Conversely, if "$a$" is decreased a larger proportion of the present signal and a smaller proportion of the stored signal are applied to the summer.

Ignoring for the moment the presence of the chroma inverter 18 (that is, assume a direct connection from the output of delay device 16 to attenuator 20), the described configuration is an infinite memory system in which a fractional amplitude portion of the sum of all previous or earlier frames are added to a fractional amplitude portion of the incoming or present video signal, the relative importance of a signal $n$ frames back being determined by the value of "$a$". For example, if "$a$" were equal to $\frac{1}{2}$ and $(1-a)$ were equal to $\frac{1}{2}$, the output signal on the line 22 would consist of $\frac{1}{2}$ of the present signal, $\frac{1}{4}$ of the next earlier frame, $\frac{1}{8}$ of the next frame behind that, 1/16 of the next frame behind that, and so on, with the consequence that the signal seven or eight frames from the present signal has little significance. If there is no motion between successive frames, the video signals representing the successive frames will be signals identical in information content; only the amount of noise in each will differ. When a multiplicity of such identical signals are summed, in the manner just described, the result is a signal identical to any one of the summed signals and of the same magnitude as the attenuated incoming signal by virtue of the fact that the sum of "$a$" and $(1-a)$ is always unity. However, when random noise present in the video signal, which may vary in amount and distribution from frame to frame, is summed, it tends to be canceled or in any case is not reinforced as is the periodic video signal. It can be demonstrated mathematically that the improvement in the signal-to-noise power ratio achievable, with the described configuration is equal to $$\frac{(1+a)}{(1-a)}.$$

Thus, if the value of "a" were $\frac{1}{2}$, the value of the fraction would be three indicating a 4.7db signal-to-noise ration improvement. Similarly, if "$a$" were greater, for example, $\frac{3}{4}$, the signal-to-noise improvement would be 8.45db.

It is significant to note that the recursive form of filter provided by the system of FIG. 1 requires only one delay element having a memory equal to 525H. It will be appreciated, however, that because the television signal is recirculated frame after frame and added to itself, the delay period must be extremely precise in order for successive frames to be added properly. Unless successive frames are in precise alignment, there will be a degradation of the signal. Not only must the frame-to-frame precision be satisfied, but even a higher degree of precision is dictated in the case of a color video signal because if the delay is not precisely 525H (less a suitable compensating delay) there will be a phase shift of the chrominance component on successive frames which could wipe out all of the color information in the recirculation process. Further, because in the NTSC system of television the phase of the chrominance component is reversed from frame-to-frame, unless this phase reversal is accounted for in the stored signal fed back to the summer 14, the sum of all of the chrominance contributions in the fed back signal would be zero. An important feature of the present invention is the provision of a method for retaining the chrominance information and integrating it along with the luminance information.

This function of the system is achieved by the chroma inverter 18, the action of which has been disregarded in the description thus far. The chroma inverter, of which both analog and digital versions are commercially available, accepts the signal from the storage device 16, separates the luminance component from the chrominance component, inverts the chrominance component and then recombines the inverted chrominance with the luminance for application to the attenuator 20 and the summer 14. This process is indicated by block 18 by the expression $(Y+\bar{C})$ where Y represents luminance and $\bar{C}$ represents inverted chrominance. Analysis of NTSC video will demonstrate that this process puts the color phase of the stored signal, that is, the sum of the past signals, in the same phase as the chrominance component of the present or incoming signal applied to the other terminal of the summer, thus enabling combination of the total incoming color video signal with the total stored color video signal. Although the details of the chroma inverter do not form a part of the present invention, it may employ a comb filter to separate the luminance from the chrominance and a circuit for inverting the chrominance component preparatory to recombination with the separated luminance component. Again, the comb filter and inverter may be either digital or analog, and, as has been noted, both forms are commercially available.

It will be recognized that the chroma inverter will introduce a certain amount of delay to the signal fed back from the delay device 16 to the summer 14; this delay, and such other incidental delays that may be present in the feedback loop, has been identified in the chroma inverter block as $\tau$. The important consideration being that the total delay from the output of the summer to the second input of the summer must be exactly 525H, the delay of the storage device 16 must be less than 525H by the period $\tau$.

Although the principle embodied in the system of FIG. 1 is applicable to both analog and digital signal processing, from the standpoint of achieving the necessary precision or accuracy of the delay, the digital form of processing has been found to produce far more satisfactory results. In a system which has been successfully operated, the 525H delay is in the form of a digital frame store having the capability of storing one pulse code modulated video frame. The particular form of the frame store is unimportant, and may be implemented with shift registers, random access memories or any other form of addressable memory, the important consideration being that with digital processing it is possible to achieve essentially unlimited timing accuracy. In addition to providing the accuracy requirements discussed above, digital processing enables extremely accurate determination of the transmission constants "$a$" and $(1-a)$ so as to avoid drifts in the value of these constants which would deleteriously affect the operation of the system.

Thus far there has been described how the system of FIG. 1 achieves signal-to-noise improvement of a color video signal by recursive filtering, the problem of motion between successive having been referred to only incidentally. In accordance with another aspect of the invention, the motion problem is solved by detecting motion between stored frames and the present signal as the picture proceeds element-by-element through the system, and in response to the evaluation of such motion changes the value of the transmission factor "$a$" (and consequently (1-$a$)) so as to alter the contribution of the stored past signals to the noise-reduced video output signal. If a picture element from the same scene object in the stored past signals is sufficiently different in amplitude from the same element in the present video signals, the past history of that picture element is ignored and only the present signal is transmitted to the output terminal. Although there would be no signal-to-noise improvement for that particular picture element, it should be noted that for the most part motion is observed only on the borders and in the fine detail of objects, and not on the broad areas of objects; that is, it is the interface between an object in a scene and its background that makes motion detectable in the displayed television picture. With this in mind, the system is operable in response to detected motion to alter "$a$" and (1-$a$) in such a way as to accommodate motion, in the limit allowing "a" to go to zero.

Figure 2:
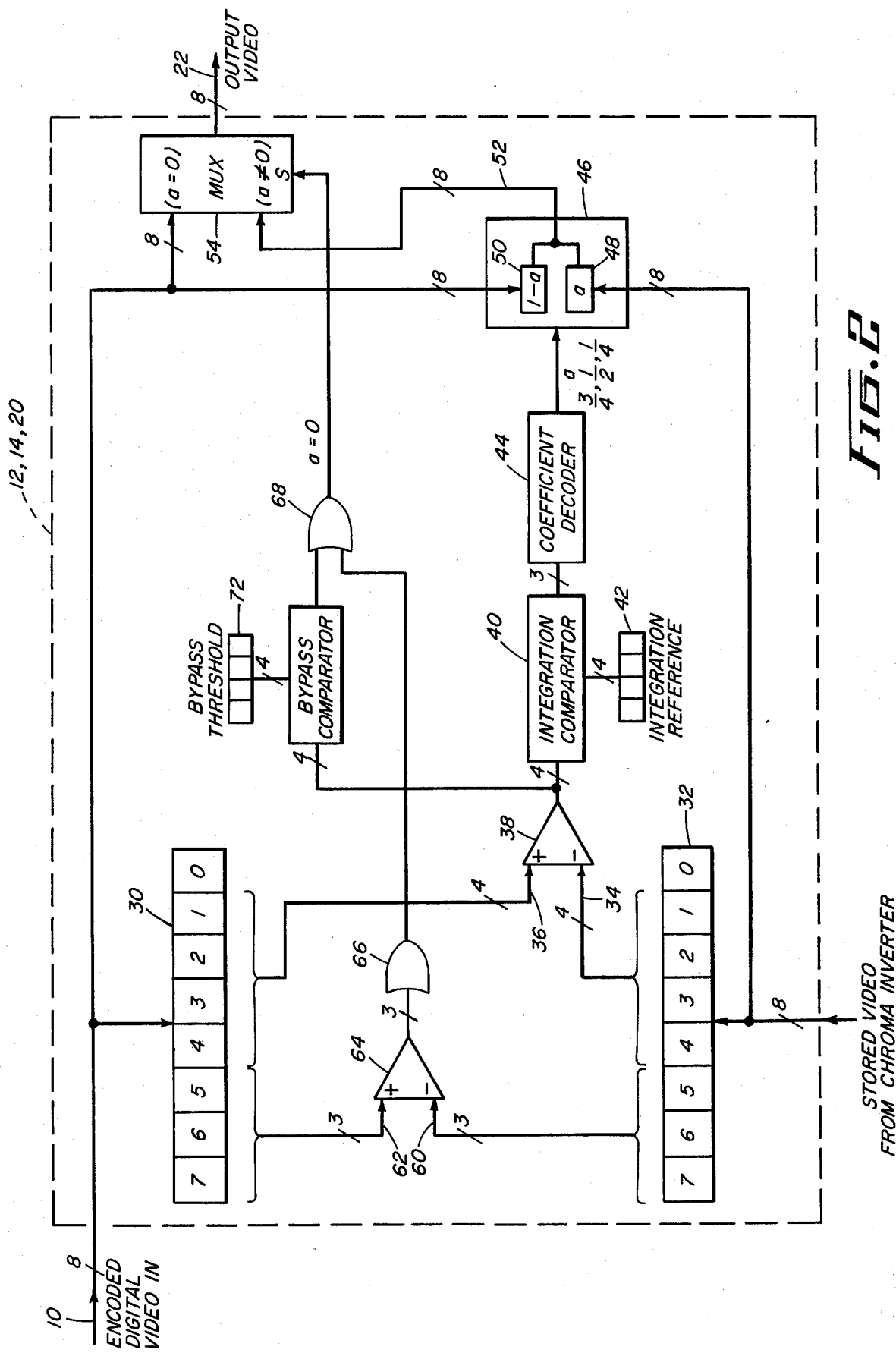
FIG. 2 is a functional block diagram of a circuit for evaluating motion between past and present video frames.

This is accomplished in the digital system shown in the functional diagram of FIG. 2 which, in essence, performs the function of the summer 14 and the attenuators 12 and 20 schematically illustrated in FIG. 1. The input signal, namely, the "present" video signal, is received on line 10 as an 8-bit PCM encoded signal and applied to a suitable register, schematically shown at 30, which receives the individual bits of each word, the elements of which being labelled "0" for the least significant bit and "7" for the most significant bit. The stored video from the chroma inverter 18 (also 8-bit PCM encoded) is applied to a similar "register" 32, the elements of which are also labelled from "0" to "7" to represent the least and most significant bits, respectively. In order to detect motion, the total past value of the signal (i.e., the stored video) is compared element by element (or byte by byte in 93 nanosecond slots) with the present video signal. That is, the 8-bit word (byte) that represents the amplitude of the total past signal in storage is compared bit-by-bit with the 8-bit word that represents the amplitude of the present video signal. In the illustrated embodiment, the least significant bit is discarded in both cases, and because it was recognized that wide differences could not be tolerated, two levels of comparison are employed. More specifically, bits 1, 2, 3 and 4 of the words representing the stored video and the present video are applied to the − and + input terminals 34 and 36, respectively, of a difference amplifier 38, the output from which is a 4-bit word representative of the difference, if any, between the stored video and the present signal. The 4-bit word from the difference amplifier is applied to an integration comparator 40 which compares it to a 4-bit integration reference number, schematically illustrated at 42, of preset value much greater than zero. The output from the integration comparator, a 3-bit word, is applied to a coefficient decoder 44 which is operative to determine the value of the "$a$" coefficient, which, as has been noted earlier, determines the fractional amplitude proportion of the stored video signal to be added to the present video signal. If the result of the comparison in the integration comparator 40 is zero, meaning that the 4-bit number from difference amplifier 38 is equal to the integration reference number, this signifies that there is a predetermined difference between the stored video and the present video signals at this level of comparison. A zero difference at the output of integration comparator 40 causes the coefficient decoder 44 to produce a coefficient "$a$" of a value such as to produce a small amount of feedback of the stored video signal. In the present embodiment, which is to be understood as illustrative only, the coefficient decoder 44 is operative, depending on the difference number produced by the integration comparator, to produce one of three values of "$a$", namely, one-fourth, one-half, or three-fourths; in the case of zero difference at the output of integration comparator 40, indicative of the greatest tolerable motion, the coefficient "$a$" has a value of one-fourth. When the difference at the output of comparator 40 is greater than zero, indicating less motion between the stored and present video than previously, the decoder produces a coefficient having a value of one-half, and when still less motion is detected, a coefficient having a value of three-fourths is produced. The coefficient "$a$", in the form of a digital word, is applied to a summing device, diagrammatically shown at 46, which includes two elements 48 and 50 labelled "$a$" and (1 - $a$), respectively, to signify the relative fractional amplitude proportions of the stored video and present video, respectively, that are summed. The stored video is applied to the element 48, the present video is applied to element 50, and the sum of their respective fractional amplitude portions is applied over line 52 as one input to a multiplexer 54 which is operative to transmit a noise-reduced video signal to the output line 22 in situations when the value of coefficient "$a$" is not zero.

To take care of the possibility of there being no difference in bits 1 - 4 of the stored and present video signals yet, a large difference actually existing between the stored and present signals which shows up in the more significant bits, a second comparison is made between bits 5, 6 and 7 of the stored video and the corresponding bits of the present video. To this end, the three most significant bits of the stored and present video are applied to the − and + input terminals 60 and 62, respectively, of a second difference amplifier 64, the 3-bit word output of which is applied to an OR circuit 66. When the difference amplifier 64 detects a difference between the three most significant bits of the stored and present video, indicating that there is motion between them in excess of the allowable threshold established by the integration reference 42, the OR circuit 66 applies a signal to one input of a second OR circuit 68 which, in turn, applies a signal to multiplexer 54 which effectively causes the coefficient "$a$" to go to zero. That is, if the motion exceeds a preset amount, none of the stored video is added to the present signal; instead, the present signal only is transmitted to the output line 22.

Although not absolutely necessary for the operation of the system, in order to obtain independence of action another circuit is provided for making the value of coefficient "$a$" go to zero under certain conditions. More particularly, the 4-bit word at the output of difference amplifier 38 is also applied to a bypass comparator 70 in which it is compared to a bypass threshold number schematically shown at 72, which is a 4-bit word of a value somewhat greater than the value of the integration reference number 42. When the difference in the output of difference amplifier 38 exceeds the bypass threshold number, bypass comparator 70 produces an output signal which is applied to a second input of OR circuit 68, which produces an output signal which is applied to multiplexer 54 to cause the value of coefficient "a" to go to zero. Thus, the coefficient "a" will go to zero, causing only the present video signal to be coupled to the output line 22, when (1) there is any difference between the three most significant bits of the stored and present video signals, or (2) the difference between four less significant bits of the stored and present video signals exceeds a preselected bypass threshold number.

Summarizing the operation of the system of FIG. 2, when comparison of the stored and present video indicates less than a predetermined amount of motion, the system automatically operates to change the value of coefficient "a" in response to the amount of motion detected. In this situation, the summer 46 combines the present video in the proportion (1 - a) with the stored video in the proportion "a", and transmits the sum signal to the "not equal to zero" input of multiplexer 54 which, in turn, couples the sum signal to the output line 22. However, when the system detects motion between the stored and present video in excess of a predetermined amount, the coefficient "a" is reduced to zero, in which case only the present video signal is coupled to the output line 22. It is important to note that when the value of "a" is caused to go to zero, the entire past history of that picture element in which excessive motion was detected is lost and only the present video representing that element is used; thereafter, the frame store has to build up a new past history for that particular element.

The described system places no restraints on the allowable motion to be portrayed in the displayed picture. Applicants have recognized that allowing those picture elements which have motion in excess of a predetermined amount to go through without noise reduction poses no serious handicap, for two reasons. First, they are individual picture elements, not broad reas in a scene, and being individual elements it is difficult to perceive noise in them. Stated another way, where there is "busyness" of signal, noise is not as apparent; on the other hand, when the signal is relatively flat or uniform, as in broad areas of a scene, noise is very apparent. The present system is operative to integrate when there is uniformity of signal, thus reducing noise, but doesn't integrate when there is movement, which normally occurs at edges between an object and its background, but again the noise is not as visible in this part of the display. Secondly, when an object is in motion the eye finds it difficult to concentrate on an edge of the object, so the fact that the object is in motion also precludes visible detection of noise associated with the signal. In effect, then, the system provides the best of both worlds; broad uniform areas of objects in motion are integrated because, with the exception of their boundaries, they are seemingly not in motion, whereas the boundaries are not integrated (if there is a sufficient amount of motion). Thus, the system gives the advantages of integration without inhibiting the motion in the displayed picture.

Figure 3:
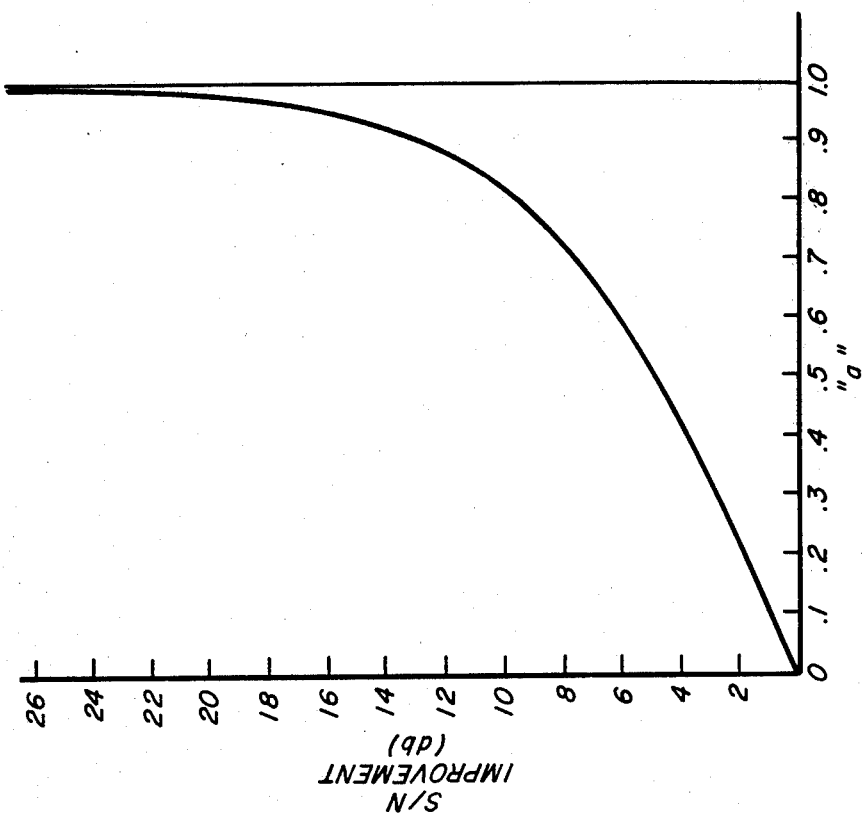
FIG. 3 is a curve showing signal-to-noise improvement as a function of the fraction of the stored video signal fed back to the summer in the system of FIG. 1.

In effect, the described system is a variable comb filter, picture element by picture element, having very narrow tines for some picture elements and wider tines for other picture elements, depending upon the amount of motion present in a particular picture element between successive frames. Consequently, the signal-to-noise improvement varies in accordance with motion from frame to frame, there being no noise reduction when the motion exceeds a predetermined amount and the noise reduction being maximum when there is little or no motion. This property of the system is graphically illustrated in FIG. 3, which is a curve showing signal-to-noise improvement for different values of "a"; it will be seen that the signal-to-noise improvement goes from zero when "a" is zero (i.e., when only present video is coupled to the output line) to approximately 13db when "a" has a value of the order of 0.9, and theoretically becomes infinite when "a" is equal to one (the case where only the stored signal is coupled to the output of the system).

Figure 4:
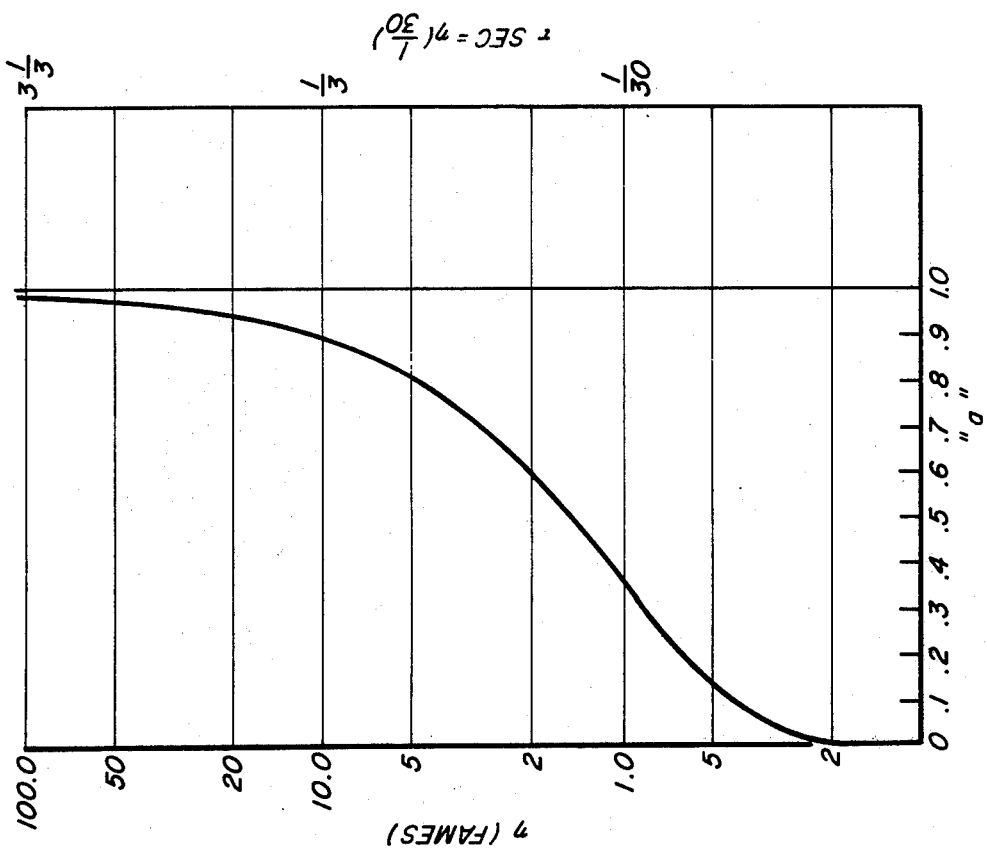
FIG. 4 is a curve showing the effective integration time constant as a function of the fraction of the stored video signal fed back to the summer in the system of FIG. 1.

The curve in FIG. 4 shows the effective integration time constant of the system of FIG. 1 as a function of the transmission constant "a", the ordinate on the left showing the time constant in terms of the number of television frames, each of which, of course, lasts for a 30th of a second. The ordinate on the right provides an absolute measure of the integration time constant in seconds. For small values of "a", indicative of significant motion between the stored and present video, the time constant is relatively short, causing the tines of the comb filter to be widened, and at the larger values of "a", a larger number of successive frames are integrated, which has the effect of narrowing the tines of the comb filter with an attendant increase in the noise reduction.

Although the system has been described for use in the NTSC system of television, it is also useful, with suitable modification of the circuit for coupling the stored video back to the summer, in other known systems. For the PAL system, for example, the chroma inverter 18 would be replaced by a chrominance corrector circuit that would alter the phase shift angle of the chrominance component of the stored signal so as to be in the proper phase relationship to be added to the chrominance component of the present video signal. Similarly, it will be evident to those knowledgeable of the SECAM system, in which the chrominance component is frequency modulated, as to what frame-to-frame adjustment to the chrominance component would have to be made to allow it to be appropriately added to the chrominance component of the present video. In general, for both PAL and SECAM, the chroma correcting circuit would require a filter for separating the chrominance from the luminance, means for applying the appropriate correction to the chrominance component, and means for recombining the corrected chrominance component with the separated luminance prior to application to the summer.

Further, although in the system of FIG. 2 values of "a" of one-fourth, one-half, and three-fourths have been used, it is to be understood that these are only by way of example, and theoretically there is no limit, particularly in a digital system, on the total number of different values "a" that may be made available. The number is limited only by practical considerations such as the amount of circuit complexity that one may wish to incorporate in return for a desired degree of signal-to-noise improvement.

It is also to be understood that although the system of FIG. 1 has been described in the context of its capability to reduce noise in a color video signal, the principle of changing the proportions of the stored and present video as a function of motion between past and present signals is also applicable to monochrome television. For a black and white application, the chroma correction circuit simply would be omitted.

DESCRIPTION OF ALTERNATIVE EMBODIMENT

FIG. 5 is a functional block diagram of an alternative system for improving the signal-to-noise ratio of a color video signal, and will be described in connection with its use in the NTSC system of television and implemented in the digital domain. As was the case of the system of FIG. 1, the system, with suitable modification, is useful in other known systems of television, and may also be implemented with analog components.

The present video signal on an input line 10, PCM-encoded using an 8-bit word, is applied to a multiplying circuit 82 which is operative to perform the function of multiplying the amplitude of the present video signal by the factor 1/N+1 and to apply the resultant signal as one input to a summing circuit 84. The significance of the term "N" will become evident as the description proceeds. The output of adder 84 is applied to a one-frame delay device 86 which has a delay of 525H, less such delays as may be introduced by the following circuit elements involved in coupling the signal stored in the delay device 86 to a second input of the summing circuit 84. The signal stored in delay device 86, which, as in the system of FIG. 1, may be a commercially available digital frame store, is applied to a chroma inverter 88, which may be of the form of and providing the same function as the chroma inverter 18 in the system of FIG. 1, and the recombined signal therefrom is applied to a second multiplying circuit 90 which is operative to multiply the delayed or stored signal by the factor N/N+1. The resultant signal at the output of multiplier 90 is applied as a second input to the summing circuit 84. It is seen from the description thus far that a fractional amplitude portion of the present video signal is added to a different fractional portion of the chroma-corrected stored signal, with the sum of the two transmission coefficients being equal to unity. A noise-reduced video signal is derived on output line 92.

In this embodiment, the ratio between the amplitude portions of the present and stored video that are added together is determined by how long it has been (that is, how many frames have passed) since motion was detected in a picture element. To this end, a tag register 92, which may be an extension of the frame store utilized as the delay device 86, is provided for counting the number of frames that have gone by since motion was last detected in a given picture element. The tag store has a capacity to store a word of length "N" for each picture element, where N equals the number of frames since motion was detected for each pixel. Since it is not necessary to integrate more than seven or eight past frames, the value of "N" can be readily stored in a 3-bit register. The value of "N" is applied to multiplying circuits 82 and 90 so that their transmission coefficients vary in unison in response to changes in the value of "N". It will now be evident that if, for example, seven frames have passed since motion was last detected (i.e., N = 7), one-eighth of the present video signal will be added to seven-eighths of the stored video signal and the sum applied to the delay device 86. Similarly, if only two frames have passed since motion was last detected, one-third of the present video signal will be applied to the summer for addition to two-thirds of the stored video signal.

The value of N is determined by comparing the incoming video signal on line 80 with the delayed or stored video from chroma inverter 88 in a comparator circuit 94, the function of which is to detect motion, on a picture element-by-element basis, between the incoming and stored video signals. the comparator 94 may be of the form shown in the left-hand portion of the system of FIG. 2, namely, consisting of a differential amplifier to the two input terminals of which are respectively applied corresponding bits of the encoded incoming signal and the encoded stored video, and an integration comparator for comparing the difference number at the output of the differential amplifier with a preselected integration or reference number, the value of which may be adjusted by the "threshold level adjust" schematically illustrated at 96 in FIG. 5. If the comparison produces a difference which does not exceed the preset threshold level a signal is produced at a first output line 98 signifying "no change" in that incoming frame just compared, which signal is coupled through a gating circuit 100 actuated by timing pulses derived from the incoming video signal, to the tag store 92 to be counted. So long as the detected motion between successive incoming frames and the stored video is less than the preset threshold amount, such "no change" signals are applied to the tag store so as to increase the value of N, which, as has been noted earlier, equals the number of frames of incoming video since motion in excess of the threshold level was detected. If, however, comparison of the incoming and stored video results in a difference in excess of the threshold level, indicative of a relatively large amount of motion in a given picture element, the comparator produces a signal on output line 102 which when applied to the tag store 92 resets the register to thereby, in effect, cause the value of N to go to zero. When this occurs, the value of the N/N+1 relationship goes to zero, and the relationship 1/N+1 becomes unity; that is, none of the stored signal is applied to the summer 84 and only the incoming video signal is applied to the delay device 86 to become the output signal. Thus, is detected motion is less than a preselected threshold amount, the level of which can be adjusted, the system continues to average the preceding and incoming frames and to apply an increasingly larger fraction of the stored video signal to the summer, and when motion exceeds the preset threshold, passes only the present video signal to the output line. It is to be noted that in the period immediately following detected motion in excess of the preselected threshold, if there is not excessive motion in the next succeeding incoming frame the value of N goes to one, with the consequence that one-half of the amplitude of that frame is summed with the next succeeding incoming frame thereby to cause the noise reduction action to occur. very quickly. This, the system does not "freeze" in noise that had been contained in immediately preceding frames.

The configuration of FIG. 5 functions as an "ideal" integrator in that it adds picture elements of the present or incoming frame to the same picture elements of N previous frames all with equal weight, thereby to obtain the highest possible signal-to-noise improvement, and this with a single delay device. It is essentially a form of recursive filter that achieves ideal signal-to-noise improvement yet requires only one delay device of one frame storage capacity together with a suitable register to count the number of samples making up the average.

It will be seen that although the configurations of FIGS. 1 and 5 utilize different averaging techniques, they have the common function of controlling the relative fractional amplitude portions of the incoming and stored video signals to be summed and averaged as a function of motion between the incoming and the stored video signals.

While the invention has been described with reference to two specific embodiments, along with suggested modifications to adapt them to other applications, it is intended that such modifications, and others that will now be apparent to one skilled in the art, be encompassed by the following claims.

We claim:

1. A noise-reducing system for reducing noise contained in television video signals arriving on an input line, said system comprising:
   summing means having first and second input terminals for adding first and second signals respectively applied thereto to produce a sum signal,
   means for coupling a first controllable fractional amplitude portion of the arriving video signal to the first input terminal of said summing means,
   delay means connected to receive a sum signal from said summing means and for delaying said sum signal for a period substantially equal to the period of one television frame,
   coupling means including means for coupling a second controllable fractional amplitude portion of the delayed signal from said delay means to the second input terminal of said summing means, and
   means for controlling in unison said first and second fractional amplitude portions as a function of motion between the video signal arriving on said input line and the delayed signal and for maintaining the sum of said first and second fractional amplitude portions equal to unity,
   whereby said summing means combines a fractional amplitude portion of each arriving television frame with a fractional amplitude portion of the sum of portions of preceding delayed frames to obtain an averaged noise-reduced video signal of an amplitude equivalent to that of the arriving video signal.

2. A noise-reducing system according to claim 1, wherein said means for controlling said first and second fractional amplitude portions comprises:
   comparator means for comparing the arriving video signal with the delayed signal and operative in response to detected motion varying over a range from substantially no motion to a preselected greater amount of motion to decrease said second fractional amplitude portion and to correspondingly increase said first fractional amplitude portion, and operative when the detected motion exceeds said preselected amount to reduce said second fractional amplitude portion to zero.

3. A noise-reducing system according to claim 1, wherein said means for controlling said first and second amplitude portions comprises:
   comparator means for comparing the arriving video signal with the delayed signal and for counting the number of successive frames N that have arrived since motion exceeding a preselected amount was last detected and for controlling said second fractional amplitude portion according to the relationship N/N+1, and for controlling said first amplitude portion according to the relationship 1/N+1, and operative when the detected motion exceeds said preselected amount to reduce said second fractional amplitude portion to zero.

4. A noise-reducing system according to claim 2 for reducing noise contained in arriving color video signals having luminance and chrominance components, wherein said coupling means for coupling a portion of the delayed video signal to the second input terminal of said summing means further includes
   chrominance correcting means for modifying the chrominance component of the delayed video signal so as to be in proper relationship to be added without cancellation to the chrominance component of the arriving color video signal.

5. A noise-reducing system according to claim 3 for reducing noise contained in arriving color video signals having luminance and chrominance components, wherein said coupling means for coupling a portion of the delayed video signal to the second input terminal of said summing means further includes
   chrominance correcting means for modifying the chrominance component of the delayed video signal so as to be in the proper relationship to be added without cancellation to the chrominance component of the arriving color video signal.

6. A noise-reducing system according to claim 4 for reducing noise contained in arriving NTSC color video signals having 525 lines per frame and in which the phase of the chrominance component is inverted from frame-to-frame, wherein
   said delay means has a delay period of substantially 525H, where H is the period of one horizontal line, and wherein said chrominance corrector means includes
   means coupled to the output terminal of said delay means for separating the stored video signal into its constituent luminance and chrominance components,
   means for inverting the separated chrominance component, and
   means for recombining the inverted separated chrominance component with the separated luminance component.

7. A noise-reducing system according to claim 5 for reducing noise-contained in arriving NTSC color video signals having 525 lines per frame and in which the phase of the chrominance component is inverted from frame-to-frame, wherein
   said delay means has a delay period of substantially 525H, where H is the period of one horizontal line, and wherein said chrominance corrector means includes
   means coupled to the output terminal of said delay means for separating the stored video signal into its constituent luminance and chrominance components,
   means for inverting the separated chrominance component, and
   means for recombining the inverted separated chrominance component with the separated luminance component.

8. A noise-reducing system according to claim 6 wherein said arriving color video signal is digitally modulated, wherein said delay means is a digital frame store, and wherein said chrominance corrector means comprises digital signal processing means for separating the stored signal into its luminance and chrominance components, inverting the separating chrominance component and recombining the inverted separated chrominance component with the separated luminance component.

9. A noise-reducing system according to claim 7 wherein said arriving color video signal is digitally modulated, wherein said delay means is a digital frame store, and wherein said chrominance corrector means comprises digital signal processing means for separating the stored signal into its luminance and chrominance components, inverting the separated chrominance component and recombining the inverted separated chrominance component with the separated luminance component.

10. A noise-reducing system according to claim 8, wherein said arriving color video signal is pulse code modulated, and wherein said comparator means includes first means for comparing corresponding bits of code words respectively representing the amplitude of the arriving and the stored video signal and producing a digital difference number representative of the measure difference, if any, between the arriving and stored video signals, second means for comparing said digital difference number with a first preselected digital reference number and for producing coefficients determinative of said second fractional amplitude portion the values of which are proportional to the extent of the difference between said difference number and said first preselected reference number, and third means operative in response to said difference number exceeding said first reference number for causing said second fractional amplitude portion to go to zero.

11. A noise-reducing system according to claim 9, wherein said arriving color video signal is pulse code modulated, and wherein said comparator means includes first means for comparing corresponding bits of code words respectively representing the amplitude of the arriving and the stored video signal, and producing a digital difference number representative of the measured difference, if any, between the arriving and stored video signals, second means for comparing said digital difference number with a digital reference number and operative to produce a first signal at the frame rate of the arriving video signal if the difference number is lower than the reference number, and to produce a second signal if the difference number exceeds the reference number, and digital storage means connected to receive said first and second signals and operative to count said first signals to provide an indication of the number of frames N that have arrived since the difference number exceeded the reference number and to be reset to N = 0 in response to said second signal.

* * * * *